United States Patent
Takeshita

(10) Patent No.: US 12,112,933 B2
(45) Date of Patent: Oct. 8, 2024

(54) IMAGING MASS SPECTROMETER

(71) Applicant: SHIMADZU CORPORATION, Kyoto (JP)

(72) Inventor: Kengo Takeshita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 359 days.

(21) Appl. No.: 17/628,969

(22) PCT Filed: Aug. 1, 2019

(86) PCT No.: PCT/JP2019/030129
§ 371 (c)(1),
(2) Date: Jan. 21, 2022

(87) PCT Pub. No.: WO2021/019752
PCT Pub. Date: Feb. 4, 2021

(65) Prior Publication Data
US 2022/0262611 A1 Aug. 18, 2022

(51) Int. Cl.
*H01J 49/00* (2006.01)
(52) U.S. Cl.
CPC ...... *H01J 49/0036* (2013.01); *H01J 49/0004* (2013.01)
(58) Field of Classification Search
CPC .............. H01J 49/0036; H01J 49/0004; G06F 2218/14; G01N 27/62
(Continued)

(56) References Cited

U.S. PATENT DOCUMENTS

2009/0261243 A1 10/2009 Bamberger et al.
2014/0316717 A1* 10/2014 Ikegami ............ H01J 49/0004
702/23

(Continued)

FOREIGN PATENT DOCUMENTS

EP 2 600 385 A1 6/2013
EP 2 797 104 A2 10/2014
(Continued)

OTHER PUBLICATIONS

Imagereveal™ MS, Shitsuryou Bunseki Imeejingu No Deeta Kaiseki Wo Kantan Ni, Omoidoori Ni (Imagereveal™ MS: Analyze your mass spectrometry imaging data in a simple and intended way), [online], Shimadzu Corporation, [accessed on Jul. 4, 2019], the Internet.

(Continued)

*Primary Examiner* — Michael Maskell
(74) *Attorney, Agent, or Firm* — Sughrue Mion, PLLC

(57) ABSTRACT

An imaging mass spectrometer according to one mode of the present invention includes: an analysis execution section (1, 31) configured to perform a mass spectrometric analysis on each of a plurality of measurement points set within a two-dimensional area on a sample, to collect mass spectrum data over a predetermined mass-to-charge-ratio range for each measurement point; a condition memory section (32) configured to store a data matrix creation condition to be used for creation of a data matrix based on the mass spectrum data acquired by the analysis in the analysis execution section; and a data matrix creation section (42) configured to begin, in the middle of an execution of the analysis by the analysis execution section or subsequently to the completion of the analysis, the creation of the data matrix based on mass spectrum data already collected until (Continued)

Fig. 2 then, according to the data matrix creation condition stored in the condition memory section.

8 Claims, 5 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 2014/0358449 A1 | 12/2014 | Strubel et al. | |
| 2016/0071711 A1* | 3/2016 | Ikegami | H01J 49/0036 250/281 |
| 2017/0352525 A1* | 12/2017 | Ikegami | G06V 20/695 |
| 2019/0221409 A1 | 7/2019 | Takeshita | |
| 2022/0237261 A1* | 7/2022 | Kozawa | G01J 3/28 |

FOREIGN PATENT DOCUMENTS

| | | |
|---|---|---|
| EP | 3 239 704 A1 | 11/2017 |
| JP | 2010-261882 A | 11/2010 |
| JP | 2014-215043 A | 11/2014 |
| JP | 2015-500466 A | 1/2015 |
| WO | 2013/080170 A1 | 6/2013 |
| WO | 2016/103312 A1 | 6/2016 |
| WO | 2017/195271 A1 | 11/2017 |

OTHER PUBLICATIONS

International Search Report of PCT/JP2019/030129 dated Oct. 8, 2019 [PCT/ISA/210].
Written Opinion of PCT/JP2019/030129 dated Oct. 8, 2019 [PCT/ISA/237].
First Office Action dated Nov. 8, 2022 from the Japanese Patent Office in JP Application No. 2021-536565.
Decision to Grant a Patent dated Feb. 14, 2023 from the Japanese Patent Office in JP Application No. 2021-536565.
Office Action issued Mar. 4, 2024 in Chinese Application No. 201980098410.5.

* cited by examiner

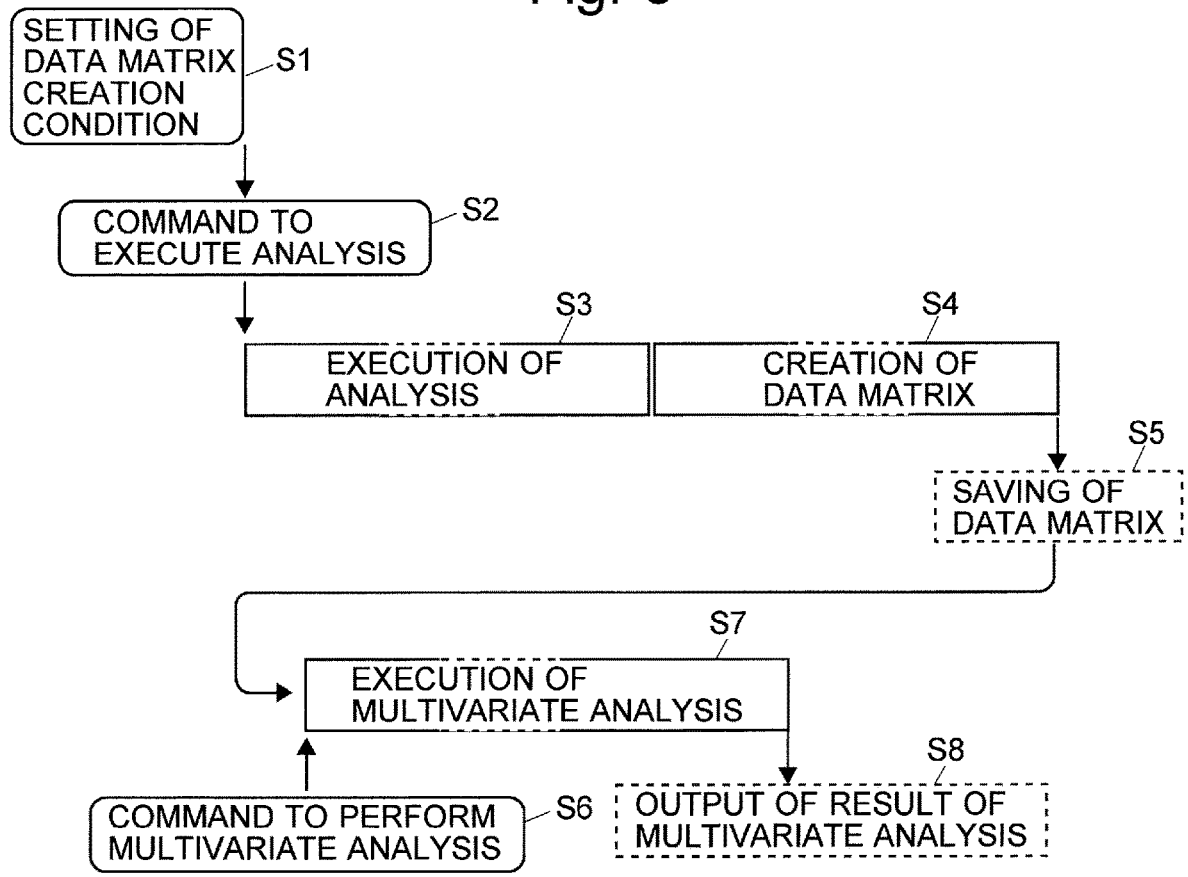

Fig. 5

| Setting Target No. 1 | | × |

Display Imaging ... | Simple Setting

Laser Irradiation Conditions
- Number of irradiations: 100 shots
- Repetition frequency: 1000 Hz
- Spot size: 0
- Laser intensity: 20.0

MS Analysis Conditions
- Polarity: ○ Negative   ● Positive
- Event type: ● MS   ○ MS/MS
- Measurement range m/z: 0 ~ 2000.0000
- Detector voltage: 2.10 kV
- MS/MS conditions:
  - Precursor m/z: 200.0000
  - Q1 resolving power: 0.1
  - CE: 0.0 Da
  - CE speed: ± 0.0

Data-Saving Conditions
- Data-file name: AREA01_test190517_2019051715273.imdx
- Data-matrix creation condition: Centroid of maximum intensity spectrum
- Expected maximum size: 3.5 GB
- Centroid detection limit: 1000
- ☑ Remove specified peaks

Comment

Fig. 6

| Setting Target No. 1 | ✕ |

Display Imaging ... | Simple Setting

Laser Irradiation Conditions

| Number of irradiations | 100 | shots |
| Repetition frequency | 1000 | Hz |
| Spot size | 0 | |
| Laser intensity | 20.0 | |

MS Analysis Conditions

| Polarity | ○ Negative | ● Positive |
| Event type | ● MS | ○ MS/MS |
| Measurement range m/z | 0 ~ 2000.0000 |
| Detector voltage | 2.10 kV |
| MS/MS conditions | Precursor m/z 200.0000 |
| | Q1 resolving power 0.1 |
| | CE 0.0 Da |
| | CE speed ± 0.0 |

Data-Saving Conditions

Data-file name    AREA01_test190517_2019051715273.imdx
Data-matrix creation condition    Target list
Expected maximum size 0.0 GB Comment

Fig. 7

| No | m/z | Compound | Composition Formula |
|---|---|---|---|
| 1 | 126.32 | Compound A | |
| 2 | 158.45 | Compound B | |

Target List

Polarity: Positive

Import ... Export ...

IMAGING MASS SPECTROMETER

CROSS REFERENCE TO RELATED APPLICATIONS

This application is a National Stage of International Application No. PCT/JP2019/030129, filed Aug. 1, 2019.

TECHNICAL FIELD

The present invention relates to an imaging mass spectrometer.

BACKGROUND ART

Mass spectrometric imaging is a technique in which the spatial distribution of a substance having a specific mass on a sample, such as a biological tissue section, is investigated based on the result of a mass spectrometric analysis performed on each of a plurality of measurement points within a predetermined area on the sample. This technique has been increasingly applied in such areas as drug discoveries, biomarker searches, and identification of the causes of various diseases. Mass spectrometers used for performing mass spectrometric imaging are generally called "imaging mass spectrometers".

A typical operation of an imaging mass spectrometer is as follows: One measurement point included in a two-dimensional range set on a sample is irradiated with an ionization probe, such as a thin laser beam, to ionize sample components which exist at the measurement point, and the thereby generated ions, or secondary ions produced from those ions by a dissociation or similar process, are subjected to mass spectrometry. By repeating the same measurement while changing the irradiation position of the ionization probe to scan a two-dimensional area on the sample, a set of mass spectrum data over a predetermined range of mass-to-charge ratios m/z is sequentially collected for each of the large number of measurement points.

The data acquired in this manner in an imaging mass spectrometer are three-dimensional data including the two-dimensional data of mass-to-charge ratios m/z and ion intensities acquired by mass spectrometry at one measurement point, along with the information representing the position of the measurement point. In other words, those three-dimensional data form the same number of mass spectrometry image graphics showing the spatial distribution of the ion intensity, as the data points in the direction of the mass-to-charge-ratio axis within the mass-to-charge-ratio range within which mass spectrometry was performed. Therefore, the data are enormous in quantity. In order to extract, from such an enormous amount of data, pieces of information which show, for example, a noteworthy spatial distribution or a significant change or difference in ion intensity, techniques of multivariate analysis, such as a principal component analysis or cluster analysis, have been widely used in a data analysis performed in an imaging mass spectrometer (see Non Patent Literature 1 or other documents).

In order to efficiently perform a multivariate analysis, the process of creating a data matrix in a predetermined format based on the collected data is normally performed as a preprocessing task for the analysis (see Patent Literature 1 or other documents). This data matrix consists of ion intensity data arrayed in rows and columns in such a manner that each row or column consists of a number of ion intensity data related to one specific mass-to-charge-ratio value, where the number of ion intensity data is equal to that of the measurement points on the sample, and a number of rows or columns of ion intensity data each of which is formed in the aforementioned manner are arranged in the direction of the columns or rows, with the number of rows or columns being equal to that of the data points in the direction of the mass-to-charge-ratio axis. In normal cases, the number of data points in the direction of the mass-to-charge-ratio axis is extremely large. Therefore, it is common to reduce the total amount of data by decreasing the number of data points in the direction of the mass-to-charge-ratio axis by extracting only the data points corresponding to the centroid positions (mass-to-charge ratios) of the peaks detected in a mass spectrum or performing a down-sampling at predetermined intervals of mass-to-charge ratio (i.e., by decimating the data).

CITATION LIST

Patent Literature

Patent Literature 1: JP 2010-261882 A

Non Patent Literature

Non Patent Literature 1: "IMAGEREVEAL™ MS, shisuryou Bunseki Imeejingu No Deeta Kaiseki Wo Kantan Ni, Omoidoori Ni (IMAGEREVEAL™ MS: Analyze your mass spectrometry imaging data in a simple and intended way)", [online], Shimadzu Corporation, [accessed on Jul. 4, 2019], the Internet

SUMMARY OF INVENTION

Technical Problem

In recent years, significant technological advancements have been made in the area of mass spectrometry. Imaging mass spectrometers have achieved a noticeable improvement in mass-resolving power as well as a noticeable improvement in the spatial resolving power of the mass spectrometric imaging graphic (i.e., an increase in image resolution). Accordingly, the number of data points has dramatically increased in the direction of the mass-to-charge-ratio axis and in the direction of the positional information of the measurement points. In some cases, the total amount of data acquired for one two-dimensional area on a sample may exceed 100 GB. The number of peaks detected in a mass spectrum has also increased with the improvement of the mass-resolving power. Due to such circumstances, multivariate analyses for locating a significant mass spectrometric imaging graphic in a huge amount of data have been increasingly important.

However, as just explained, since the amount of data collected in an imaging mass spectrometer is enormous, and since the data matrix also tends to be large in size, the period of time required for the creation of the data matrix which is a necessary preprocessing task for multivariate analysis has been extremely long. For example, currently available imaging mass spectrometers require at least 5-10 hours to acquire hundreds of gigabytes of imaging mass spectrometry data with a solution of 100M pixels. Furthermore, the process of creating a data matrix based on the thus acquired data also requires at least a few hours. In the case of performing a multivariate analysis using a set of already collected data, the process of creating the data matrix must be initially performed, so that the user needs to wait for hours before initiating the substantial process of the multivariate analysis. This has been considerably stressful for the user.

The present invention has been developed in view of the previously described problem. Its primary objective is to provide an imaging mass spectrometer which reduces the amount of stress on the user during the waiting time and improves the working efficiency over the period from the point in time where imaging mass spectrometry is performed to collect data to the point in time where a multivariate analysis based on the acquired data is performed to obtain the result of the analysis.

Solution to Problem

An imaging mass spectrometer according to one mode of the present invention developed for solving the previously described problem includes:
 an analysis execution section configured to perform a mass spectrometric analysis on each of a plurality of measurement points set within a two-dimensional area on a sample, to collect mass spectrum data over a predetermined mass-to-charge-ratio range for each measurement point;
 a condition memory section configured to store a data matrix creation condition to be used for the creation of a data matrix based on the mass spectrum data acquired by the analysis in the analysis execution section; and
 a data matrix creation section configured to begin, in the middle of an execution of the analysis by the analysis execution section or subsequently to the completion of the analysis, the creation of the data matrix based on mass spectrum data already collected until then, according to the data matrix creation condition stored in the condition memory section.

Advantageous Effects of Invention

In an analysis using a conventional imaging mass spectrometer, after measurements for all measurement points on a sample have been completed and mass spectrum data acquired on each measurement point on the sample have been stored, when it is necessary to create a data matrix for a multivariate analysis or other purposes, the user sets a data matrix creation condition and issues a command to perform a data matrix creation process. Upon receiving the setting and the command, the imaging mass spectrometer performs the data matrix creation.

By comparison, in the imaging mass spectrometer according to the previously described mode of the present invention, the data matrix creation condition for the creation of the data matrix based on mass spectrum data acquired by an analysis is stored in the condition memory section beforehand, typically before the execution of the analysis. For example, the data matrix creation condition may be set by a user at an appropriate point in time before the execution of the analysis, or it may be default information prepared by the device manufacturer (or the like). Under the condition that the data matrix creation condition is already set, the analysis execution section receives an analysis initiation command (or the like) by the user and initiates a mass spectrometric analysis on a plurality of measurement points set within a two-dimensional area on a sample, to collect mass spectrum data over a predetermined range of mass-to-charge ratios for each measurement point. In the middle of the execution of the analysis, or subsequently to the completion of the analysis, the data matrix creation section begins to create a data matrix based on the mass spectrum data according to the already set data matrix creation condition, without waiting for the instruction from the user. That is to say, in the imaging mass spectrometer according to the previously described mode of the present invention, the collection of data by an analysis and the creation of the data matrix based on the collected data are performed in a continuous or substantially integrated (and partially concurrent) form.

Accordingly, in the imaging mass spectrometer according to the previously described mode of the present invention, the data matrix is already completed when the user is going to perform a multivariate analysis. The user can immediately initiate the multivariate analysis, omitting the conventionally required task of creating the data matrix. This reduces the amount of stress on the user during the waiting time before the multivariate analysis and improves the working efficiency. The imaging mass spectrometer according to the present mode effectively increases the period of time until the completion of the analysis by an amount corresponding to the period of time for the data matrix creation process. Meanwhile, it is often the case that the analysis operation is performed during the nighttime, on a non-business day or similar period since the acquisition of data by an analysis originally requires a long period of time. Therefore, in many cases, it will pose no serious problem for the user when the period of time required for the completion of the analysis is increased by the addition of the period of time for the creation of the data matrix; the advantage of the prompt initiation of the multivariate analysis will be far more than compensating for the disadvantage.

The data matrix described earlier is an array of data from which the ion intensity data of all measurement points corresponding to any or specified mass-to-charge ratio can be easily extracted. Such a data matrix is suitable for the creation of a mass spectrometric imaging graphic at a specified mass-to-charge ratio. Therefore, the imaging mass spectrometer according to the previously described mode of the present invention can promptly display a mass spectrometric imaging graphic after the completion of the data acquisition.

BRIEF DESCRIPTION OF DRAWINGS

FIG. 3 is a diagram illustrating the flow of a sequence of operations from an analysis to a multivariate analysis in the imaging mass spectrometer according to the present embodiment.

FIG. 4 is a diagram showing the concept of the data matrix.

FIG. 5 is a diagram showing an example of a condition-setting screen in the imaging mass spectrometer according to the present embodiment.

FIG. 6 is a diagram of the condition-setting screen in FIG. 5, in which the data matrix creation condition has been changed.

FIG. 7 is a diagram showing an example of a target list setting screen in the case where the target list is selected as the data matrix creation condition.

DESCRIPTION OF EMBODIMENTS

One embodiment of the imaging mass spectrometer according to the present invention is hereinafter described with reference to the attached drawings.

Figure 1:
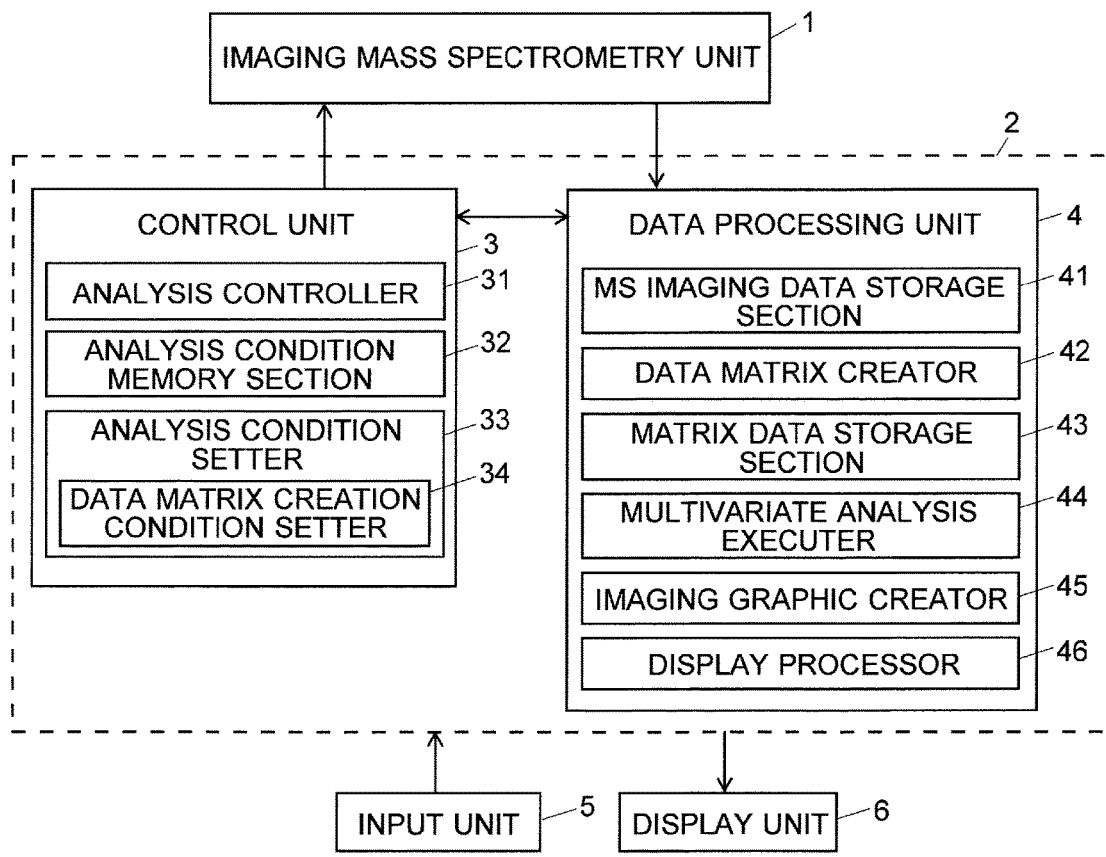
FIG. 1 is a configuration diagram of the main components of an imaging mass spectrometer which is one embodiment of the present invention.
Figure 2:
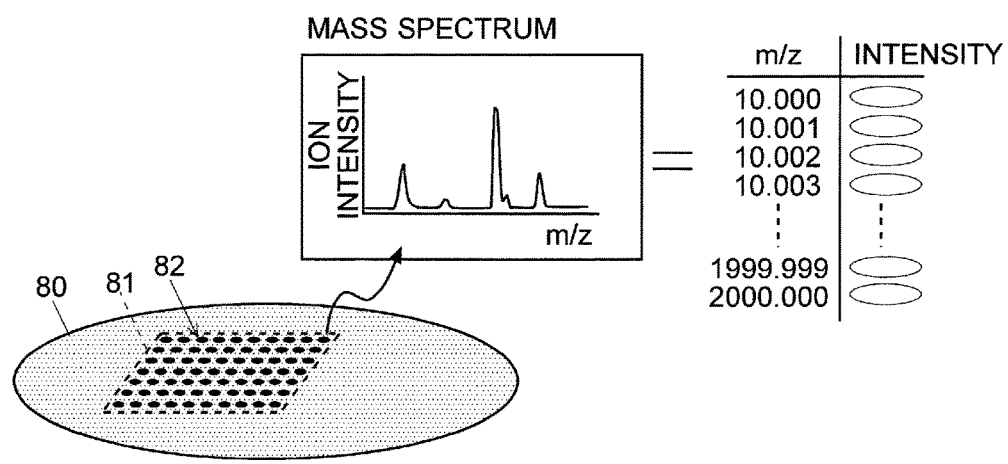
FIG. 2 is a diagram illustrating a mass spectrometric operation in the imaging mass spectrometer according to the present embodiment.

FIG. 1 is a configuration diagram of the main components of the imaging mass spectrometer according to the present embodiment. FIG. 2 is a diagram illustrating a mass spectrometric operation in the imaging mass spectrometer according to the present embodiment.

The imaging mass spectrometer according to the present embodiment includes: an imaging mass spectrometry unit 1 capable of performing a mass spectrometric analysis on each of a large number of measurement points within a two-dimensional area on a sample to acquire mass spectrum data for each measurement point; a control unit 3 configured to control the operation of each component in the imaging mass spectrometry unit 1; a data processing unit 4 configured to save and process data acquired by the imaging mass spectrometry unit 1; as well as an input unit 5 and a display unit 6 which are user interfaces.

The imaging mass spectrometry unit 1 includes a mass spectrometer capable of an MS/MS analysis (or an MS$^n$ analysis, with n being equal to or greater than two), such as a MALDI ionization ion-trap time-of-flight mass spectrometer (MALDI-IT-TOFMS). A triple quadrupole mass spectrometer, quadrupole time-of-flight mass spectrometer or similar device including a MALDI ion source may also be used in place of the MALDI-IT-TOFMS. The ion source is not limited to the MALDI ion source; it may be an LDI or SALDI ion source. Furthermore, an ion source which uses an ion beam, electron beam or other particle beams for ionization in place of the laser light is also available.

In the imaging mass spectrometry unit 1, as shown in FIG. 2, a mass spectrometric analysis (a normal mass spectrometric analysis or MS/MS analysis) is sequentially performed on each of a plurality of measurement points 82 within a two-dimensional area 81 on a sample 80 placed on a sample stage (not shown). Consequently, a set of data forming a mass spectrum as shown in FIG. 2 can be acquired for each measurement point.

The control unit 3 includes an analysis controller 31, analysis condition memory section 32 and analysis condition setter 33, as its functional blocks. The analysis condition setter 33 includes a data matrix creation condition setter 34 as a sub-functional block. The data processing unit 4 includes an MS imaging data storage section 41, data matrix creator 42, matrix data storage section 43, multivariate analysis executer 44, imaging graphic creator 45 and display processor 46 as its functional blocks.

In normal cases, the control unit 3 and the data processing unit 4 are constructed by using a personal computer or similar multipurpose computer, on which the aforementioned functional blocks in the control unit 3 and the data processing unit 4 can be embodied by executing dedicated controlling-processing software installed on the same computer.

The imaging mass spectrometer according to the present embodiment can perform a multivariate analysis based on a huge amount of data acquired by executing an imaging mass spectrometric analysis on a sample. Hereinafter, the sequence of the processing and operations from the collection of data to the output of the result of a multivariate analysis is described. FIG. 3 is a diagram illustrating the flow of the sequence of operations from an analysis to a multivariate analysis in the imaging mass spectrometer according to the present embodiment.

Initially, in advance of the execution of an analysis on a sample, the user performs a predetermined operation with the input unit 5. In response to this operation, the analysis condition setter 33 displays an analysis condition setting screen in a predetermined form on the display unit 6. FIG. 5 shows one example of the analysis condition setting screen 100.

As shown in FIG. 5, within the analysis condition setting screen 100, a setting-target sample selection area 101, laser irradiation condition setting area 102, MS analysis condition setting area 103 and data-saving condition setting area 104 are arranged. The laser irradiation condition setting area 102 and the MS analysis condition setting area 103 are areas for setting analysis conditions for executing an analysis to be performed in the imaging mass spectrometry unit 1. Specifically, the laser irradiation condition setting area 102 is an area for setting the conditions for the ionization in the MALDI ion source, while the MS analysis condition setting area 103 is an area for setting analysis conditions other than the ion source. On the other hand, the data-saving condition setting area 104 is an area for setting the conditions for saving mass spectrum data collected in the imaging mass spectrometry unit 1. This area includes an area for setting a data matrix creation condition.

The conditions that can be set in the laser irradiation condition setting area 102 are the number of irradiations per one measurement point, repetition frequency of the laser irradiation, laser spot size, and laser intensity. The conditions that can be set in the MS analysis condition setting area 103 are the polarity of the measurement-target ion, event type (selected from the normal mass spectrometric analysis and MS/MS analysis), measurement range (mass-to-charge-ratio range of the measurement target) and detector voltage. When the MS/MS analysis is selected as the event type, additional conditions can also be set, such as the mass-to-charge-ratio value of the precursor ion, resolving power in the front quadrupole mass filter (Q1), and collision energy (CE).

Within the data-saving condition setting area 104, a data-file name box 105 for specifying the file name which data should be saved as, and a dropdown box 106 for selecting the data matrix creation condition, are arranged. Under the control of the data matrix creation condition setter 34, the dropdown box 106 allows for the selection of one of the options prepared beforehand as the data matrix creation condition.

As shown in FIG. 4, the data matrix is an array of matrix elements each of which is a piece of ion intensity data acquired at one measurement point for one mass-to-charge-ratio value, with the mass-to-charge-ratio values (m/z values) arranged in one direction (in the present example, the horizontal direction) and the position information of the measurement point within the two-dimensional area arranged in the other direction (in the present example, the vertical direction). The data matrix creation condition shows how to determine the m/z values in the horizontal direction of this matrix. Specific contents of the data matrix creation condition are hereinafter described.

In the imaging mass spectrometer according to the present embodiment, two options are prepared as the data matrix creation condition: the "Centroid of maximum intensity spectrum" as shown in FIG. 5 and the "Target list" as shown in FIG. 6.

In the case of the "Centroid of maximum intensity spectrum", the m/z values in the data matrix are determined as follows: Initially, the mass spectra at all measurement points are searched to locate the maximum ion intensity data for each m/z value, and a maximum intensity spectrum is created by arranging the maximum ion intensity data along the m/z axis. Subsequently, the peaks in the maximum intensity spectrum are detected according to a predetermined peak detection condition. For each detected peak, centroid processing is performed to calculate the centroid position of the peak. The m/z values corresponding to the centroid positions of all detected peaks are used as the m/z values in the data matrix, i.e., the m/z values in FIG. 4. Here, an additional function may be provided for removing, from the list of the m/z values obtained for the data matrix, information of m/z values which are previously known and obviously unnecessary, such as an m/z value originating from the matrix used for MALDI.

On the other hand, in the case of the "Target list", the m/z values in a target list which has been set by the user are directly used as the m/z values in the data matrix, i.e., the m/z values in FIG. 4. As shown in FIG. 6, when the "Target list" option of the dropdown box 106 is selected by the user, a button for setting the list appears at the right end of the dropdown box. When this button is clicked, the data matrix creation condition setter 34 displays a target list setting screen 200 as shown in FIG. 7 in a separate window. The user enters the compound names as the measurement targets and the corresponding m/z values in the target list 201. The "Import" function allows the user to load the compound names, m/z values and other related items of information from a separately prepared compound list or similar source of information into the target list 201. When the target list 201 is completed, the user clicks the "OK" button 202 to fix the target list 201.

In addition to the previously described options of the data matrix creation condition, the following options may be added:

"Centroid of average intensity spectrum": Under this data matrix creation condition, an average mass spectrum, which is a mass spectrum obtained by averaging the mass spectra obtained at all measurement points, can be used in place of the maximum intensity spectrum in the "Centroid of maximum intensity spectrum" option.

"All mass-to-charge-ratio values": Under this data matrix creation condition, the downsizing of the data in the m/z direction is not performed; the ion intensity data at all m/z values obtained by the mass spectrometric analysis are used in the data matrix.

"Mass-to-charge-ratio values within a specific mass-to-charge-ratio range": Under this data matrix creation condition, the user is allowed to set a specific m/z range, and the ion intensity data at all m/z values included in that range are used in the data matrix.

"Down-sampling at specific intervals of mass-to-charge ratio": Under this data matrix creation condition, the user is allowed to set a specific interval of m/z, and the ion intensity data at m/z values selected at the specific intervals of m/z are used in the data matrix.

The user appropriately sets the items in the laser irradiation conditions, MS analysis conditions and data-saving conditions on the displayed analysis condition setting screen. As for the data matrix creation conditions, the setting can be performed by the selection of an option with the dropdown box 106 and the setting of the target list in the previously described manner (Step S1). In the data-file name box 105, an appropriate file name may be set for the file in which the mass spectrum data collected by the analysis or the data obtained by the data matrix creation process are to be saved. After the analysis conditions have been thus set, the user performs a predetermined operation, whereupon the analysis condition setter 33 stores the analysis conditions, including the data matrix creation conditions, in the analysis condition memory section 32.

Subsequently, the user issues a command to initiate the analysis by a predetermined operation (Step S2). Then, the analysis controller 31 controls the imaging mass spectrometry unit 1 so as to conduct an imaging mass spectrometric analysis according to the analysis conditions stored in the analysis condition memory section 32. The imaging mass spectrometry unit 1 sequentially performs a mass spectrometric analysis for each of the measurement points which are set within the two-dimensional area 81 on the sample 80 and acquires mass spectrum data corresponding to each measurement point (Step S3).

The acquired data are stored in the MS imaging data storage section 41 in the data processing unit 4. The mass spectrum data corresponding to one measurement point in this stage is a one-dimensional array of data of the ion intensity values covering a predetermined range of mass-to-charge ratios (the mass-to-charge-ratio range set as one of the MS analysis conditions) at mass-to-charge-ratio intervals determined by the resolving power of the device, as shown in the example of FIG. 2. The file in which the data are to be saved in the MS imaging data storage section 41 is the file whose name was previously given in the data-file name box 105.

With the mass spectrometric analysis for all measurement points 82 within the two-dimensional area thus completed, and all mass spectrum data obtained by the analysis thus stored in the MS imaging data storage section 41, the analysis operation itself by the imaging mass spectrometry unit 1 is over. Subsequently to the completion of the analysis, the data matrix creator 42 initiates the data matrix creation process based on the collected mass spectrum data (Step S4). The data matrix creator 42 creates a data matrix according to the data matrix creation condition which was set on the analysis condition setting screen 100 before the execution of the analysis.

Specifically, when the "Centroid of maximum intensity spectrum" is set as the data matrix analysis condition, the data matrix creator 42 initially searches for the maximum ion intensity for each mass-to-charge-ratio value, based on the mass spectrum data corresponding to all measurement points stored in the MS imaging data storage section 41. Then, it creates a maximum intensity spectrum using the maximum ion intensity values respectively located for the mass-to-charge ratios. The data matrix creator 42 subsequently detects peaks in the maximum intensity spectrum and performs centroid processing for each detected peak; i.e., it determines the centroid position of each peak. If there are 100 peaks detected in the maximum intensity spectrum, 100 different values of the mass-to-charge ratio will be determined. These mass-to-charge-ratio values are adopted as the m/z values in the data matrix, and the ion intensity data at each of the m/z values is extracted from the mass spectrum data at each measurement point. Using the extracted ion intensity data, the data matrix creator 42 creates a data matrix as shown in FIG. 4.

On the other hand, when the "Target list" is set as the data matrix creation condition, the data matrix creator 42 adopts the mass-to-charge-ratio values in the specified target list as the m/z values in the data matrix; for example, in the case of the target list shown in FIG. 7, the two m/z values of m/z 126.32 and m/z 158.45 are adopted. Then, the ion intensity data at each of the m/z values is extracted from the mass spectrum data at each measurement point, and a data matrix as shown in FIG. 4 is created using the extracted ion intensity data.

The data matrix creator 42 stores the thus created data matrix in the matrix data storage section 43 (Step S5). It should be noted that the MS imaging data storage section 41 and the matrix data storage section 43 in the present example are separated from each other for convenience of explanation. In practice, those data may be entirely stored in one file having the data-file name set in the data-saving conditions.

The sequence of the processing from the issue of the user command for initiating the execution of the analysis, through the execution of the analysis on the sample and the creation of the data matrix based on the data acquired by the analysis, to the storage of the data matrix in the matrix data storage section 43, is continuously performed without requiring human involvement. Accordingly, in the present example, the data acquisition by the analysis and the data matrix creation are practically integrated.

The period of time required for an analysis of a sample depends on the size of the two-dimensional area on the sample, spatial-resolving power (intervals of the measurement points) and other factors. In normal cases, the required time will be at least several hours. On the other hand, the period of time required for the creation of the data matrix depends on the data matrix creation condition, number of measurement points and other factors, which may be as long as a few hours. Therefore, performing the data matrix creation in the integrated form causes a corresponding increase in the period of time for the user to wait for the completion of the analysis. However, an analysis operation by an imaging mass spectrometer is often carried out with no operator, e.g., during the nighttime or on a non-business day, in which case there is no user (operator) standing by until the end of the analysis. Therefore, the aforementioned increase in the period of time until the completion of the analysis does not pose a significant problem for the user.

After the completion of the analysis (e.g., immediately after the analysis or on a later day), when a multivariate analysis based on the collected data should be performed, the user performs a predetermined operation with the input unit 5 to specify the data file (or the like) to be analyzed and issues a command to execute the analysis (Step S6). There are various techniques for multivariate analysis. For example, a principal component analysis, hierarchical cluster analysis, partial least squares regression or other techniques can be used for imaging mass spectrometry.

In the case of a conventional device, it is at this point in time that the creation of the data matrix is initiated. In the case of the imaging mass spectrometer according to the present embodiment, the data matrix has already been prepared. Therefore, upon receiving the command for initiating the analysis, the multivariate analysis executer 44 reads necessary data for the multivariate analysis from the matrix data storage section 43 and immediately performs the processing of the multivariate analysis using the data (Step S7). After the multivariate analysis has been completed, the multivariate analysis executer 44 displays the analysis result on the display unit 6 via the display processor 46 (Step S8).

The period of time required for the multivariate analysis depends on the amount of data to be analyzed, type of technique of the multivariate analysis and other factors. In any case, the required time is shortened by a certain amount due to the omission of the creation of the data matrix, which may be as long as several hours in some cases. In a multivariate analysis, when a user monitoring the progress of the multivariate analysis has found that the analysis is inappropriate, an interruptive operation is often performed, such as the discontinuation of the analysis or alteration of parameters. Therefore, it is often the case that the user attends the execution of the multivariate analysis. Forcing the user to wait until the creation of the data matrix is completed would place a considerable amount of mental stress on the user and lower his/her working efficiency. By comparison, in the case of the imaging mass spectrometer according to the present embodiment, since there is no waiting time for the data matrix creation, the user can immediately initiate the planned multivariate analysis. This reduces the amount of stress due to the waiting time and improves the working efficiency.

Creating the data matrix subsequently to the analysis is also advantageous in terms of the display of the mass spectrometric imaging graphic.

In the case where data are saved in a normal data format as shown in FIG. 2, when an imaging graphic is to be created, it is necessary to locate, for each measurement point, the data corresponding to the target mass-to-charge ratio in the data array of ion intensities associated with the mass-to-charge-ratio values. Therefore, the larger the number of data in the mass-to-charge-ratio direction and the position direction is, the longer the period of time for the creation and display of the imaging graphic becomes. By comparison, in the case of the imaging mass spectrometer according to the present embodiment, since the data are organized in the form of the data matrix as shown in FIG. 4, the imaging graphic creator 45 quickly retrieves, from the matrix data storage section 43, the ion intensity data corresponding to the target mass-to-charge ratio for all measurement points and creates an imaging graphic when the mass-to-charge ratio has been specified. Therefore, the mass spectrometric imaging graphic at the user-specified mass-to-charge ratio can be promptly displayed.

In the previous description, the data matrix creation process is performed subsequently to the completion of the collection of all data by the analysis. Depending on the data matrix creation condition, the creation of the data matrix may be initiated before all data are completely collected. More specifically, the creation of the data matrix can be initiated even before the completion of the analysis for all measurement points in the case of a data matrix creation condition in which the processing to be initially performed does not use mass spectrum data at all measurement points, as with the maximum intensity spectrum or average intensity spectrum. In that case, the creation of the data matrix may be initiated in the middle of the analysis. This shortens the period of time required until the data matrix is completed.

In FIG. 3, the processing of Step S1 can be omitted. That is to say, the system may be configured to perform an analysis and data matrix creation according to analysis conditions previously stored in the analysis condition memory section 32, without requiring the user to set the data matrix creation condition and other analysis conditions. As another possibility, the analysis conditions except for the data matrix creation condition may be set by the user before the analysis, while the data matrix creation condition may be previously stored in the analysis condition memory section 32.

It should be noted that the previous embodiment is one example of the present invention, and any change, modification or addition appropriately made within the spirit of the present invention will naturally be included within the scope of claims of the present application.

For example, the form for the user to set the data matrix creation condition, as well as the contents of the data matrix creation condition, can be appropriately changed. The imaging mass spectrometry unit 1 does not need to be configured to perform mass spectrometry by directly irradiating each measurement point on the sample with a laser beam or similar ionization probe as shown in FIG. 2. It may be configured to use specimens prepared by placing or adhering small pieces of a sample respectively collected from the measurement points on the sample, as well as perform a mass spectrometric analysis and collect mass spectrum data for each measurement point by irradiating the specimen corresponding to the measurement point with an ionization probe. In any case, any device capable of collecting mass spectrum data corresponding to each measurement point on a sample can be used.

[Various Modes]

A person skilled in the art can understand that the previously described illustrative embodiment is a specific example of the following modes of the present invention.

(Clause 1) An imaging mass spectrometer according to one mode of the present invention includes:
- an analysis execution section configured to perform a mass spectrometric analysis on each of a plurality of measurement points set within a two-dimensional area on a sample, to collect mass spectrum data over a predetermined mass-to-charge-ratio range for each measurement point;
- a condition memory section configured to store a data matrix creation condition to be used for the creation of a data matrix based on the mass spectrum data acquired by the analysis in the analysis execution section; and
- a data matrix creation section configured to begin, in the middle of an execution of the analysis by the analysis execution section or subsequently to the completion of the analysis, the creation of the data matrix based on mass spectrum data already collected until then, according to the data matrix creation condition stored in the condition memory section.

In the imaging mass spectrometer described in Clause 1, the data matrix is already completed when the user is going to perform a multivariate analysis. The user can immediately initiate the multivariate analysis, omitting the conventionally required task of creating the data matrix. This reduces the amount of stress on the user during the waiting time before the multivariate analysis and improves the working efficiency. The created data matrix is an array of data from which the ion intensity data of all measurement points corresponding to any or specified mass-to-charge ratio can be easily extracted. Such a data matrix is suitable for the creation of a mass spectrometric imaging graphic at a specified mass-to-charge ratio. Therefore, the imaging mass spectrometer described in Clause 1 can promptly display a mass spectrometric imaging graphic after the completion of the data acquisition.

(Clause 2) The imaging mass spectrometer described in Clause 1 may further include a multivariate analysis processing section configured to perform a multivariate analysis using the data matrix created by the data matrix creation section.

The imaging mass spectrometer described in Clause 2 can perform a multivariate analysis using a data matrix subsequently to the creation of the data matrix, for example.

(Clause 3) The imaging mass spectrometer described in Clause 1 may further include a condition-setting section configured to allow a user to set the data matrix creation condition before the execution of the analysis by the analysis execution section, and to store the set data matrix creation condition in the condition memory section.

The imaging mass spectrometer described in Clause 3 allows the user to set any or desired data matrix creation condition according to the purpose of the analysis, use of the data matrix or other factors.

(Clause 4) In the imaging mass spectrometer described in Clause 3, the condition-setting section may be configured to allow the user to set the data matrix creation condition along with an analysis condition for the analysis by the analysis execution section.

The imaging mass spectrometer described in Clause 4 allows the analysis condition and the data matrix creation condition to be set in a combined form. This reduces the time and labor to be spent by the user.

(Clause 5) In the imaging mass spectrometer described in Clause 1, the data matrix creation section may be configured to switch the point in time to begin the creation of the data matrix between a point in time in the middle of the execution of the analysis by the analysis execution section and a point in time immediately after the analysis, depending on the data matrix creation condition stored in the condition memory section.

With the imaging mass spectrometer described in Clause 5, in some cases, it may be possible to shorten the period of time required for the completion of the data matrix by beginning the creation of the data matrix in the middle of the execution of the analysis.

(Clause 6) In the imaging mass spectrometer described in Clause 1, the data matrix creation condition may include a requirement that the data matrix be created for mass-to-charge ratios described in a list of target substances.

The imaging mass spectrometer described in Clause 6 can promptly create a data matrix dedicated to specific compounds to be observed when those compounds are determined beforehand.

(Clause 7) In the imaging mass spectrometer described in Clause 1, the data matrix creation condition may include a requirement that the data matrix be created for mass-to-charge ratios corresponding to peaks in an average mass spectrum or maximum intensity mass spectrum calculated based on all mass spectrum data collected.

The imaging mass spectrometer described in Clause 7 can efficiently create a data matrix for various compounds, including known and unknown ones, contained in a sample while minimizing the number of detection omissions of the compounds.

REFERENCE SIGNS LIST

1 . . . Imaging Mass Spectrometry Unit
2 . . . Multipurpose Computer
3 . . . Control Unit
31 . . . Analysis Controller
32 . . . Analysis Condition Memory Section
33 . . . Analysis Condition Setter
34 . . . Data Matrix Creation Condition Setter
4 . . . Data Processing Unit
41 . . . MS Imaging Data Storage Section
42 . . . Data Matrix Creator
43 . . . Matrix Data Storage Section
44 . . . Multivariate Analysis Executer
45 . . . Imaging Graphic Creator
46 . . . Display Processor
5 . . . Input Unit
6 . . . Display Unit
80 . . . Sample
81 . . . Two-Dimensional Area
82 . . . Measurement Point
100 . . . Analysis Condition Setting Screen
101 . . . Setting-Target Sample Selection Area

102 . . . Laser Irradiation Condition Setting Area
103 . . . MS Analysis Condition Setting Area
104 . . . Data-Saving Condition Setting Area

The invention claimed is:

1. An imaging mass spectrometer, comprising:
an analysis execution section configured to perform a mass spectrometric analysis on each of a plurality of measurement points set within a two-dimensional area on a sample, to collect mass spectrum data over a predetermined mass-to-charge-ratio range for each measurement point;
a condition memory section configured to store a data matrix creation condition to be used for creation of a data matrix based on the mass spectrum data acquired by the analysis in the analysis execution section; and
a data matrix creation section configured to begin, in a middle of an execution of the analysis by the analysis execution section, the creation of the data matrix based on mass spectrum data already collected until then, according to the data matrix creation condition stored in the condition memory section.

2. The imaging mass spectrometer according to claim 1, further comprising a multivariate analysis processing section configured to perform a multivariate analysis using the data matrix created by the data matrix creation section.

3. The imaging mass spectrometer according to claim 1, further comprising a condition-setting section configured to allow a user to set the data matrix creation condition before the execution of the analysis by the analysis execution section, and to store the set data matrix creation condition in the condition memory section.

4. The imaging mass spectrometer according to claim 3, wherein the condition-setting section is configured to allow a user to set the data matrix creation condition along with an analysis condition for the analysis by the analysis execution section.

5. The imaging mass spectrometer according to claim 1, wherein the data matrix creation condition includes a requirement that the data matrix be created for mass-to-charge ratios described in a list of target substances.

6. The imaging mass spectrometer according to claim 1, wherein the data matrix creation condition includes a requirement that the data matrix be created for mass-to-charge ratios corresponding to peaks in an average mass spectrum or maximum intensity mass spectrum calculated based on all mass spectrum data collected.

7. The imaging mass spectrometer according to claim 1, wherein a timing to store the data matrix creation condition in the condition memory section is earlier than the execution of the analysis by the analysis execution section.

8. An imaging mass spectrometer, comprising:
an analysis execution section configured to perform a mass spectrometric analysis on each of a plurality of measurement points set within a two-dimensional area on a sample, to collect mass spectrum data over a predetermined mass-to-charge-ratio range for each measurement point;
a condition memory section configured to store a data matrix creation condition to be used for creation of a data matrix based on the mass spectrum data acquired by the analysis in the analysis execution section; and
a data matrix creation section configured to begin, in a middle of an execution of the analysis by the analysis execution section or in response to completion of the analysis, the creation of the data matrix based on mass spectrum data already collected until then, according to the data matrix creation condition stored in the condition memory section, wherein the data matrix creation section is further configured to switch a point in time to begin the creation of the data matrix between a point in time in the middle of the execution of the analysis by the analysis execution section and a point in time immediately after the analysis, depending on the data matrix creation condition.

\* \* \* \* \*